United States Patent [19]

Cameron

[11] 4,067,095
[45] Jan. 10, 1978

[54] CLOSING SPRING ASSEMBLY FOR SLAM-SHUT VALVES

[75] Inventor: Albert Rea Cameron, Huntingdon Beach, Calif.

[73] Assignee: The Singer Company, New York, N.Y.

[21] Appl. No.: 692,164

[22] Filed: June 2, 1976

[51] Int. Cl.² .......................................... B23P 15/00
[52] U.S. Cl. .................................. 29/157.1 R; 29/446; 137/461; 137/315; 251/73
[58] Field of Search .............. 137/461, 462, 463, 315, 137/316; 251/73, 303, 228; 29/157.1 R, 446, 227; 267/167

[56] References Cited

U.S. PATENT DOCUMENTS

| | | | |
|---|---|---|---|
| 2,750,185 | 6/1956 | Moore | 29/227 |
| 3,209,773 | 10/1965 | Klaus | 137/463 |
| 3,422,841 | 1/1969 | Farrer | 137/463 |
| 3,602,249 | 8/1971 | Zingg | 137/463 |
| 3,719,200 | 3/1973 | Draper et al. | 137/315 |

FOREIGN PATENT DOCUMENTS 966,146  8/1964  United Kingdom ................. 251/303

Primary Examiner—C.W. Lanham
Assistant Examiner—Daniel C. Crane

Attorney, Agent, or Firm—Harold Weinstein; Edward L. Bell; Robert E. Smith

[57] ABSTRACT

A slam-shut valve provides overpressure protection in a pipeline in the event of regulator failure. The slam-shut valve is normally held latched in the open position. Overpressure or failure of the regulator will automatically trigger operation of the slam-shut valve to close the same and prevent further passage of the gas through the pipeline. The slam-shut valve is manually reset to the open position once it has been triggered closed.

The invention includes mounting the closing spring upon the lever in loaded position. The latch lever forms a subassembly, which in turn, is installed in the housing of the slam-shut valve to operatively interconnect the latch and release mechanisms and the reset mechanism. Subsequent to installing the lever, one end of the loaded closing spring is released from the lever to snap into position against the adjacent housing wall to bias the lever to the closed position. However, closing is normally prevented by the latch which releasably holds the lever in the open position.

The slam-shut valve has a valve housing to which is assembled a diaphragm housing. The lever will be installed with the diaphragm housing removed.

2 Claims, 9 Drawing Figures

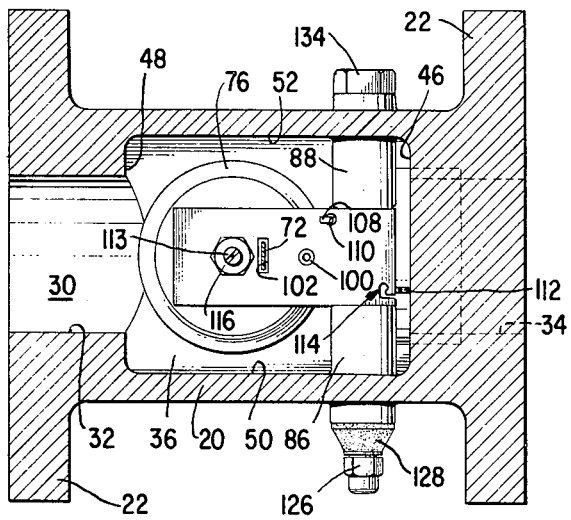
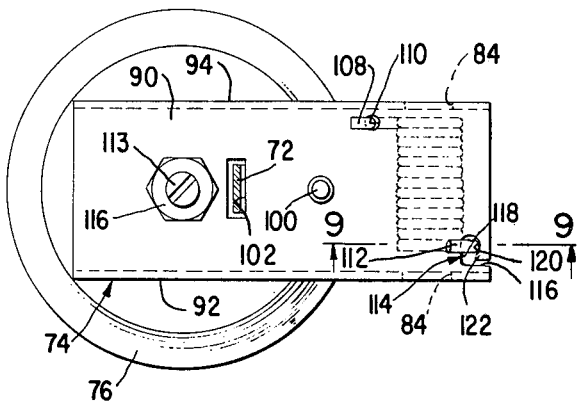
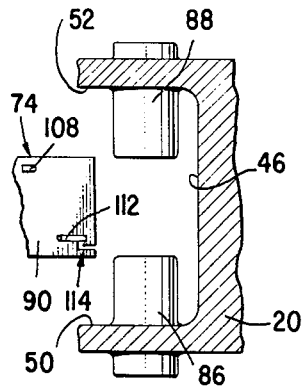
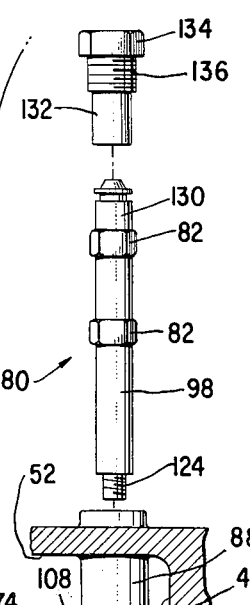
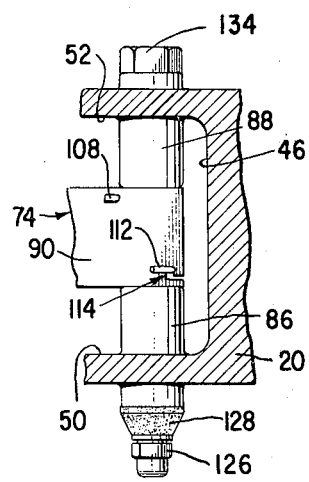
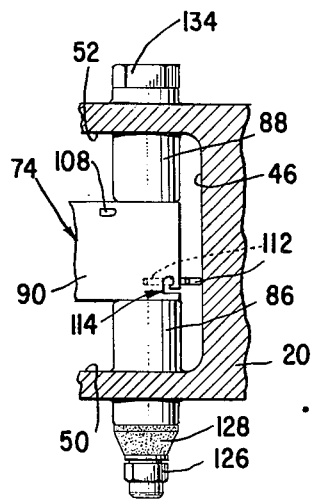
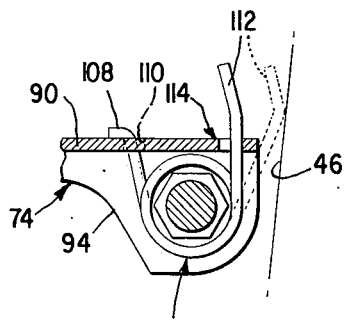

CLOSING SPRING ASSEMBLY FOR SLAM-SHUT VALVES

BACKGROUND OF THE INVENTION

Heretofore, the slam-shut valves of the prior art have used various types of latches and/or levers with different kinds of reset assemblies. In the prior art, when a closing spring was associated with a lever, it would be necessary to simultaneously assemble the spring to the lever, and the lever to a pivot shaft. This type of installation is difficult, due to the nature of the assembly which involves many mating parts, and also because its location occurs in a relatively inaccessible-close-quartered-opening in the valve housing.

SUMMARY OF THE INVENTION

It is therefore an object of the present invention to provide an improved closing spring assembly for slam-shut valves which overcomes the prior art disadvantages; which is simple, economical and reliable; which mounts the closing spring on the lever to form a subassembly; which has one end of the closing spring releasably held within the latch lever of the reset assembly; which uses a valve housing accessible through a removably connected diaphragm housing; which permits connection of the lever to the reset shaft prior to release of the one end of the closing spring from the lever to bias the lever to a close position; and which permits installation of the lever subassembly with the reset assembly prior to activation of the closing spring and connection of the diaphragm housing to valve housing.

Other objects and advantages will be apparent from the following description of one embodiment of the invention, and the novel features will be particularly pointed out hereinafter in the claims.

BRIEF DESCRIPTION OF THE DRAWINGS

This invention is illustrated in the accompanying drawings in which:

FIG. 3 is a top plan view, taken along line 3—3 of FIG. 2.

FIG. 4 is a top plan view of the latch-lever subassembly of the present invention.

FIGS. 5 through 8 show top plan views of the steps of installation of the lever subassembly with the reset assembly, wherein FIG. 5 shows the lever subassembly about to be disposed between a pair of mounting bosses formed in the valve housing; FIG. 6 is an exploded view showing the latch-lever subassembly in position to receive the reset shaft; FIG. 7 shows the reset shaft connected to the lever subassambly prior to the closing spring being released; FIG. 8 shows the reset assembly with the closing spring released and in operative position.

FIG. 9 is a side elevational view, partly in section, of a view taken along line 9—9 of FIG. 4.

DESCRIPTION OF THE INVENTION

Figure 1:
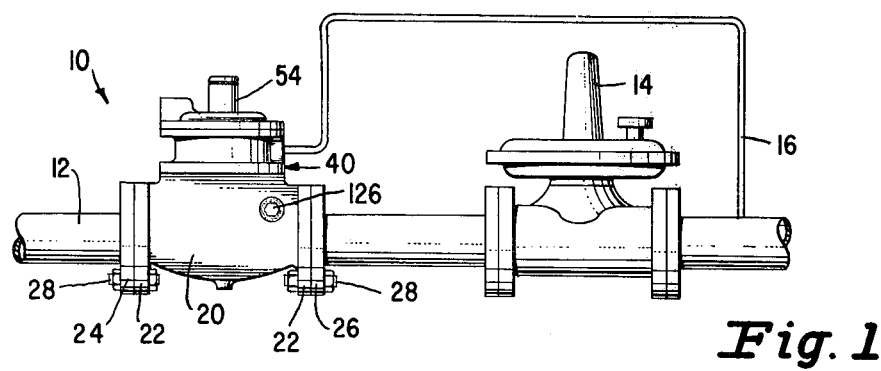
FIG. 1 is a side elevational view showing a typical installation with the slam-shut valve connected in a pipeline upstream of and in series with a pressure regulator.

A slam-shut valve, designated generally as 10, embodying the present invention, is illustrated in FIG. 1 connected in a gas pipeline or system 12, upstream of a pressure regulator 14. A pressure sensing line 16 is connected to communicate the pressure in the pipeline 12 downstream of the pressure regulator 14 to the slam-shut valve 10. When the pressure communicated by line 16 to the slam-shut valve 10 increases above a preset "trip" pressure, the slam-shut valve 10 will automatically trip, as more fully described hereinafter, to close the valve 10 and prevent any further flow to the downstream side thereof and of pipeline 12. Once the cause of the overpressure condition has been corrected, the slam-shut valve 10 can be manually reset by use of a reset assembly, designated generally 18. The reset assembly is shown in FIG. 2 to be open in the solid line representation, and to be closed in the dotted line representation.

The slam-shut valve 10 has a housing valve 20 formed with annular radial flanges 22, 22 at either axial end thereof, which serve to connect the slam-shut valve 10 to corresponding flanges 24 and 26 of the pipeline 12 by studs 28, shown only in FIG. 1.

Figure 2:
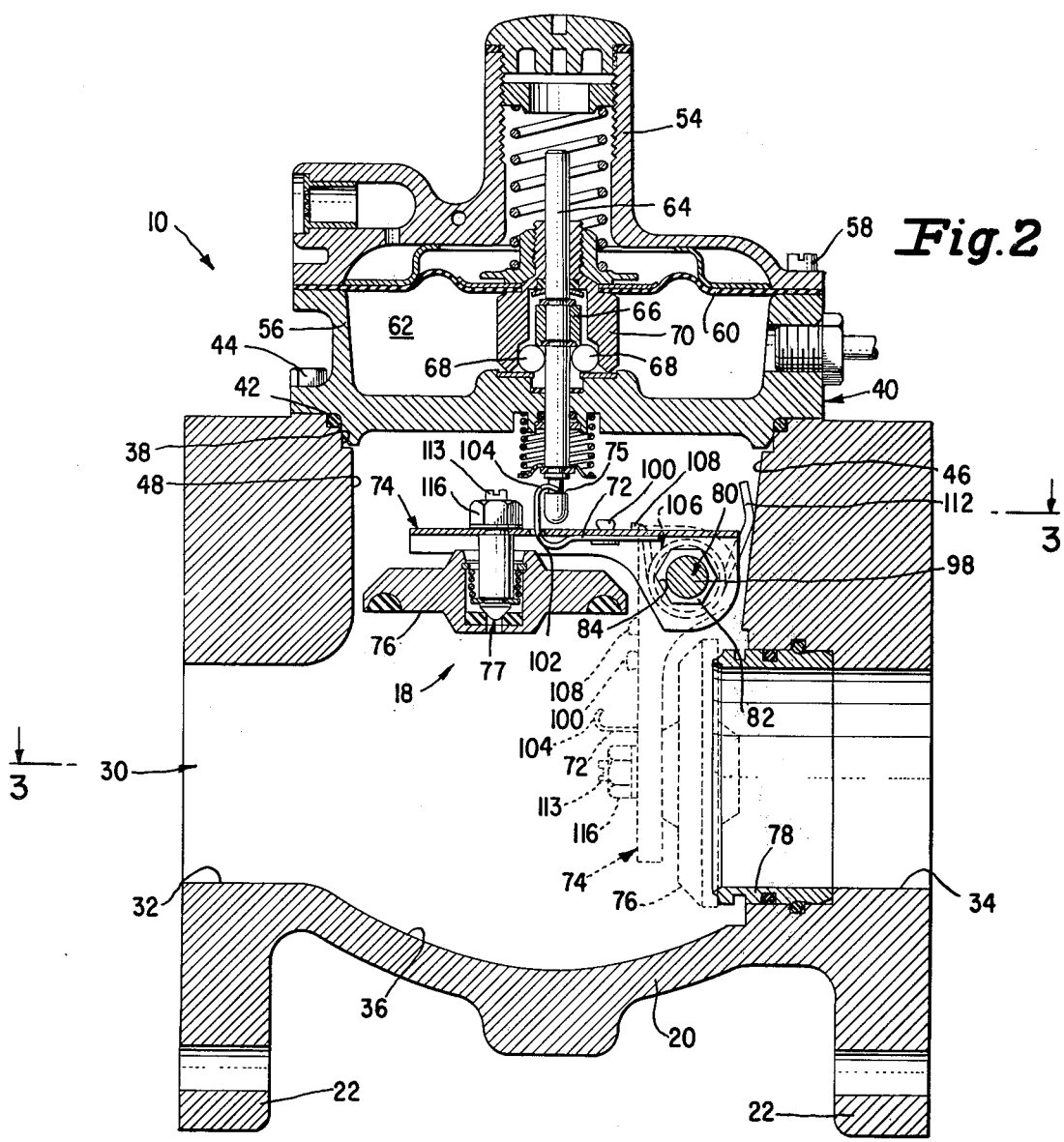
FIG. 2 is a sectional side elevational view of the slam-shut valve embodying the closing spring assembly of the present invention.

The housing 20 as illustrated in FIGS. 2 and 3, includes a central flow passage 30 extending substantially axially for alignment with corresponding flow passages in the pipeline 12. Flow passage 30 has an inlet portion 32 and an outlet portion 34, each of which, communicate with a central valve chamber 36 therein. The chamber 36 extends upwardly from the flow passage 30, and terminates in an open top 38 of the housing 20, which is enclosed by a diaphragm housing 40 with the connection therebetween sealed by an O-ring 42. The diaphragm housing 40 is connected to or disconnected from the housing 20 by bolts 44, only one of which is shown in FIG. 2.

The portion of the chamber 36 which lies above the flow passage 30 is bounded by a front wall 46, a rear wall 48 and side walls 50 and 52, respectively, as illustrated in FIG. 3.

The diaphragm housing illustrated in FIG. 2 has an upper portion 54 and a lower portion 56 interconnected by screws 58 to sandwich the peripheral edge of a diaphragm 60 therebetween. A pressure chamber 62 is formed in the interior of the lower portion 56 below the diaphragm 60. The sensing line 16 is connected to and communicates with the pressure chamber 62.

A release shaft 64 has a holding collar 66 engaged by balls 68 which are radially restrained by a ball cage 70 affixed to and movable with the diaphragm 60. Overpressure communicated to chamber 62 will raise the diaphragm 60 and ball cage 70 to permit the balls 68 to release the collar 66 and allow the shaft 64 to drop vertically downwardly to trip or release latch 72 affixed to a lever 74. The lever 74 carries a valve element 76, and upon release, moves from the open solid line position shown in FIG. 2 to the closed dotted line position in which the valve element sealingly engages a valve seat or seat ring 78 mounted in the outlet passage 34 to prevent flow therethrough. Once the valve element 76 is closed upon the seat 78, the slam-shut valve 10 must be manually reset via the reset assembly 18 and rotation of the reset shaft 80 which has hexagon heads 82 engageable with hexagon sockets 84 of the lever 74, thus pivotally raising the lever 74 to restore the shaft 64 in the held position and to relatch latch 72 therewith, as is illustrated in FIG. 2.

The reset assembly 18 illustrated in FIGS. 2 and 3, is composed of various subassemblies which include such components as the reset shaft 80, which pivotally carries the lever 74 to which is affixed the latch member 72 releasably held within a groove 75 of the release shaft 64. Also, included is an equalizing valve 77 which interconnects the lever 74 and the valve element or seat disc 76 designed to coact with a valve seat or seat ring 78. The reset shaft 80 is mounted in a pair of bosses 86 and 88 formed on opposite side walls 50 and 52, respectively of the upper portion of the central chamber 36 at a location above and transverse to the central flow passage 30.

The lever 132 illustrated in FIGS. 2, 3 and 4, has a flat body portion 90 with a downturned side flanges 92 and 94 which are narrow at the forward end and ear-shaped at the end adjacent the reset shaft 80. The hexagon sockets 84, 84 are sized to correspond to the hexagon bolt heads 82 and 82 respectively, shown in FIG. 6, are formed in the ear of each of the flanges 92 and 94, and will permit the shank 98 of the shaft 80 to pass therethrough in assembly as described more fully hereinafter. The latch 72 is riveted as at 100 to the underside of the body 90 of the lever 74, and extends therefrom through a slot 102 in a vertical direction to terminate in a bent finger 104 which engages the flat lower surface of the groove 75 as shown in FIG. 2, normally to hold the lever 74 in a raised substantially horizontal position.

A closing spring 106 in assembled position will be coiled about the shank 98 intermediate the bolt heads 82 and 82 of the reset shaft 80 to be confined between the pair of ears of the flanges 92 and 94. The closing spring 106 has one end 108 thereof extending through an aperture 110 of the body 90 to hook the spring 106 to the lever 74, while in the assembled position shown in FIGS. 2 and 3, the other end 112 thereof pushes against an end wall 46 to urge the lever 74 to pivot counterclockwise about the shaft 80 as viewed in FIG. 2 which movement is normally prevented by the latch 72 engaging the release shaft 64.

The lever 74 is illustrated in FIG. 4 as a subassembly wherein: the latch 72 is affixed at 100; the valve element 76 is interconnected to the body 90 by the shoulder screw 113 and nut 116 of the equalizer valve 77; and the closing spring 106 has the end 108 hooked into the aperture 110 and the end 112 detachably connected into a substantially "L"-shaped retention slot 114.

The slot 114 has a horizontal leg 116 and a vertical leg 118 which terminates at its upper end in an arcuate setback 120, extending forwardly of and separated from the horizontal leg 116 by an inwardly extending bulbous projection 122. The area of the setback 120 is slightly larger than the diameter of the spring 106, so that once the end 112 is secured therein, it will bear against the setback 120 and be prevented from accidental dislodgement therefrom by projection 122.

The subassembly lever 74 will be assembled within the valve housing 20 as depicted in the steps of assembly of FIGS. 5 through 8, wherein the diaphragm housing 40 has either been removed or has not yet been connected to the valve housing 20, but will be as shown in FIG. 2 subsequent to completion of the installation of the reset assembly 18 therein.

The subassembly lever 74 is shown in FIG. 5 about to be placed between the oppositely formed internally extending bosses 86 and 88. The closing spring 106 is coiled and extends between the flanges 92 and 94 of the lever 74 by being craddled in position by its ends 108 and 112 held in compressed condition within aperture 110 and slot 114, respectively, as is illustrated in FIGS. 4 and 9.

The reset shaft 80 illustrated in FIG. 6 has a shank 98 which is disposed into and through the boss 88, the lever 74 and closing spring 106 and the boss 86. The leading end 124 has a threaded section of reduced diameter to which a cage nut 126 and dust seal 128 is affixed. The connection between the cage nut 126 and threaded end 124 will join the nut 126 to the shaft 80 nonrotatively once such connection is complete. This is represented by threads at the end 124 being left handed, but if desired, the connection could be keyed or otherwise solidly joined. The other end 130 is rotatively disposed within an inner sleeve end 132 of a shoulder nut 134 which is threadedly connected into the interior of boss 88 at its threaded section 136 to complete the assembly of reset shaft 80 within the housing 20, as illustrated in FIG. 7.

The releasable end 112 is shown in FIG. 7 still captive witin the slot 114, and it will continue to be so sheld until after the complete installation of the reset shaft 80 mounts the lever 74 thereto.

Thereafter, the end 112 will be pried out of the slot 114 to snap into assembled position against the front wall 46 of the chamber 36. Until the release of the end 112 of the closing spring 106, the lever 74 was free to be moved about and mounted within the reset assembly 18, while the spring 10 is retained thereon in loaded condition.

Subsequently, the diaphragm housing 40 will be connected to the housing 20 as illustrated in FIG. 2, with the latch 72 engaging the release shaft 64 to hold the reset assembly 18 in the open position.

It will be understood that various changes in the details, materials, arrangements of parts and operating conditions which have been herein described and illustrated in order to explain the nature of the invention, may be made by those skilled in the art within the principles and scope of the invention.

I claim:
1. A method of assembling a closing spring assembly in a housing of a slam-shut valve including the steps of:
   a. forming a channel shaped lever with a substantially full top and downturned opposing sides,
   b. slotting the end of the top of the lever with a non-linear slot,
   c. nesting a coil spring on the underside of the top of the lever,
   d. affixing one end of the spring to the lever inwardly of the end thereof,
   e. pretensioning the spring by releasably disposing the other end of the spring in the lever slot,
   f. positioning the lever in the housing unconnected,
   g. passing a reset shaft through the coil spring, with the shaft to journal the lever at the downturned sides in the housing, and
   h. releasing the said other end of the spring from the lever slot to have it biased against the housing to urge the lever to shift to a closed position.

2. A method claimed in claim 1 including the steps of:
   a. supporting the fixed end and the releasable end of the coil spring on the lever during assembly thereof in the housing,
   b. carrying the fixed end of the spring on the lever after assembly in the housing, and
   c. abutting the releasable end of the spring with the housing after the lever is assembled therein.

* * * * *